(12) United States Patent
Kobayashi et al.

(10) Patent No.: US 8,434,783 B2
(45) Date of Patent: May 7, 2013

(54) GAS GENERATOR FOR RESTRAINING DEVICE OF VEHICLE

(75) Inventors: Tomoharu Kobayashi, Tatsuno (JP); Naoki Matsuda, Tatsuno (JP)

(73) Assignee: Daicel Chemical Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 13/059,732

(22) PCT Filed: Jan. 14, 2010

(86) PCT No.: PCT/JP2010/050659
§ 371 (c)(1),
(2), (4) Date: Apr. 28, 2011

(87) PCT Pub. No.: WO2010/082679
PCT Pub. Date: Jul. 22, 2010

(65) Prior Publication Data
US 2011/0221175 A1     Sep. 15, 2011

(30) Foreign Application Priority Data

Jan. 15, 2009  (JP) .................................... 2009-6467

(51) Int. Cl.
*B60R 21/26* (2011.01)
(52) U.S. Cl.
USPC .......................................... 280/741; 280/736
(58) Field of Classification Search .................. 280/736, 280/741; 102/530, 531
See application file for complete search history.

(56) References Cited

U.S. PATENT DOCUMENTS

| | | | |
|---|---|---|---|
| 4,296,084 A * | 10/1981 | Adams et al. ................. | 423/351 |
| 5,048,862 A | 9/1991 | Bender et al. | |
| 5,087,070 A | 2/1992 | O'Loughlin et al. | |
| 5,458,371 A | 10/1995 | Fulmer et al. | |
| 5,466,420 A * | 11/1995 | Parker et al. .................. | 280/736 |
| 5,564,741 A | 10/1996 | Ward et al. | |

(Continued)

FOREIGN PATENT DOCUMENTS

| | | |
|---|---|---|
| CN | 101041345 A | 9/2007 |
| DE | 198 12 221 A1 | 9/1998 |

(Continued)

OTHER PUBLICATIONS

Chinese Office Action issued in Chinese Patent Application No. 201080004389.7 on Nov. 23, 2012.

*Primary Examiner* — Toan To
*Assistant Examiner* — Robert A Coker
(74) *Attorney, Agent, or Firm* — Birch, Stewart, Kolasch & Birch, LLP

(57) ABSTRACT

A gas generator includes, a housing having a circumferential wall portion defining a gas discharge port, a first end, and a second end, the first and second ends being closed, a cup-shaped inner tube member disposed in the housing, an inside thereof accommodating an ignition device, an outside thereof being a combustion chamber charged with a gas generating agent, a bottom surface of the inner tube member being located in a bottom plate of the first end of the housing, an opening end portion of the inner tube member being provided with a ventilating portion for allowing a combustion product to pass therethrough, an igniter attached to an igniter attaching portion formed at the second end of the housing, and a passage for the combustion product formed between an inner wall surface of the inner tube member and the igniter attaching portion, and reaching the ventilating portion.

9 Claims, 4 Drawing Sheets

U.S. PATENT DOCUMENTS

| | | | |
|---|---|---|---|
| 5,582,427 A | 12/1996 | Rink et al. | |
| 5,951,040 A | 9/1999 | McFarland et al. | |
| 5,984,352 A * | 11/1999 | Green et al. | 280/736 |
| 6,126,197 A * | 10/2000 | Muir et al. | 280/741 |
| 6,142,515 A | 11/2000 | Mika | |
| 6,196,281 B1 * | 3/2001 | Schwallie et al. | 141/330 |
| 6,213,501 B1 * | 4/2001 | Hock | 280/736 |
| 6,227,565 B1 | 5/2001 | McFarland et al. | |
| 6,234,521 B1 | 5/2001 | Katsuda et al. | |
| 6,257,617 B1 * | 7/2001 | McFarland et al. | 280/736 |
| 6,334,245 B2 * | 1/2002 | Katsuda et al. | 29/462 |
| 6,406,060 B1 * | 6/2002 | Katsuda et al. | 280/736 |
| 6,409,214 B2 * | 6/2002 | Katsuda et al. | 280/741 |
| 6,854,395 B2 * | 2/2005 | Katsuda et al. | 102/530 |
| 6,942,249 B2 | 9/2005 | Iwai et al. | |
| 7,520,530 B2 * | 4/2009 | Yamazaki | 280/736 |
| 7,591,483 B2 | 9/2009 | Nakayasu et al. | |
| 7,600,783 B2 | 10/2009 | Numoto et al. | |
| 7,614,875 B2 * | 11/2009 | Katsuda et al. | 431/253 |
| 7,763,092 B2 | 7/2010 | Koyama et al. | |
| 7,806,954 B2 | 10/2010 | Quioc | |
| 2003/0051630 A1 | 3/2003 | Katsuda et al. | |
| 2003/0057687 A1 * | 3/2003 | Nakashima et al. | 280/736 |
| 2003/0137139 A1 | 7/2003 | Iwai et al. | |
| 2004/0155444 A1 | 8/2004 | Matsuda et al. | |
| 2005/0001414 A1 | 1/2005 | Matsuda et al. | |
| 2005/0151357 A1 * | 7/2005 | Yamazaki | 280/741 |
| 2006/0151977 A1 * | 7/2006 | Yamazaki | 280/736 |
| 2007/0063494 A1 | 3/2007 | Saito et al. | |
| 2007/0095035 A1 | 5/2007 | Quioc | |
| 2007/0222195 A1 | 9/2007 | Yabuta et al. | |
| 2008/0118408 A1 | 5/2008 | Numoto et al. | |
| 2010/0117344 A1 | 5/2010 | Windhausen et al. | |

FOREIGN PATENT DOCUMENTS

| | | |
|---|---|---|
| DE | 100 02 799 A1 | 1/2001 |
| DE | 10 2007 052 828 A1 | 5/2008 |
| DE | 10 2007 033 344 A1 | 5/2009 |
| EP | 0 012 626 A1 | 6/1980 |
| EP | 1 127 753 A1 | 8/2001 |
| EP | 1 671 856 A1 | 6/2006 |
| EP | 1 837 253 A1 | 9/2007 |
| FR | 2 922 007 A1 | 4/2009 |
| GB | 2 022 194 A | 12/1979 |
| JP | 5-213147 A | 8/1993 |
| JP | 10-95302 A | 4/1998 |
| JP | 2000-198409 A | 7/2000 |
| JP | 2001-301561 A | 10/2001 |
| JP | 2005-53382 A | 3/2005 |
| JP | 2005-193762 A | 7/2005 |
| JP | 2007-15573 A | 1/2007 |
| JP | 2008-114718 A | 5/2008 |
| WO | WO 94/25315 A1 | 11/1994 |
| WO | WO 2009/043904 A2 | 4/2009 |

* cited by examiner (a)          (b)

US 8,434,783 B2

GAS GENERATOR FOR RESTRAINING DEVICE OF VEHICLE

1. BACKGROUND OF THE INVENTION

The present invention relates to a gas generator for a restraining device of a vehicle, such as an airbag apparatus.

2. DESCRIPTION OF THE RELATED ART

As a gas generator using a gas generating agent, there is known one in which an igniter is accommodated in a cylinder disposed in a central portion of a housing and the outside of the cylinder is a combustion chamber accommodating a gas generating agent. In such a gas generator, when the igniter is activated, a flame and the like are ejected from a hole formed in the cylinder into the combustion chamber, whereby the gas generating agent is ignited. At this moment, because the hole is formed above the igniter, the gas generating agent on the upper side of the combustion chamber is ignited and burnt by the flame, while the gas generating agent on the lower side is ignited and burnt by combustion of another gas generating agent. Therefore, the ignition property of the gas generating agent on the lower side is degraded.

JP-A No. 2005-53382 discloses a gas generator, wherein an inner cylindrical body 16 is disposed within a housing 3 formed by an initiator shell 1 and a closure shell 2, and a combustion chamber 5 is formed so as to surround the inner cylindrical body 16 and is filled with a gas generating agent 4. The inner cylindrical body 16 is disposed in a central portion of the housing 3, and an enhancer 17 and igniter 18 are disposed therein.

U.S. Pat. No. 5,458,371 discloses an airbag inflator. A cylindrical member 120 is disposed inside a housing 102 formed by a diffuser cover 104 and base wall 106, the inside of the cylindrical member 120 is an ignition chamber 124, while the outside is a combustion chamber/filter chamber 132. A hole 130 communicating the both chambers with each other is formed with inclination on a circumferential wall surface of the cylindrical member 120. A combustion product generated from the ignition chamber 124 is discharged toward the lower side of the combustion chamber/filter chamber 132 (base wall 106 side).

SUMMARY OF INVENTION

A gas generator for a restraining device of a vehicle includes:

a housing forming an outer shell container of the gas generator, having a circumferential wall portion which is provided with a gas discharge port, a first end and a second end opposite to the first end, the first end and the second end being both closed, a cup-shaped inner tube member disposed in the housing, an inside thereof being an ignition chamber accommodating an ignition device, an outside thereof being a combustion chamber charged with a gas generating agent, a bottom surface of the cup-shaped inner tube member being located in (toward the side of) a bottom plate of the first end of the housing, an opening end portion of the inner tube member provided with a ventilating portion for allowing a combustion product to pass therethrough, an igniter of the ignition device attached to an igniter attaching portion formed at the second end of the housing, a passage for the combustion product formed between an inner wall surface of the cup-shaped inner tube member and the igniter attaching portion, and reaching the ventilating portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
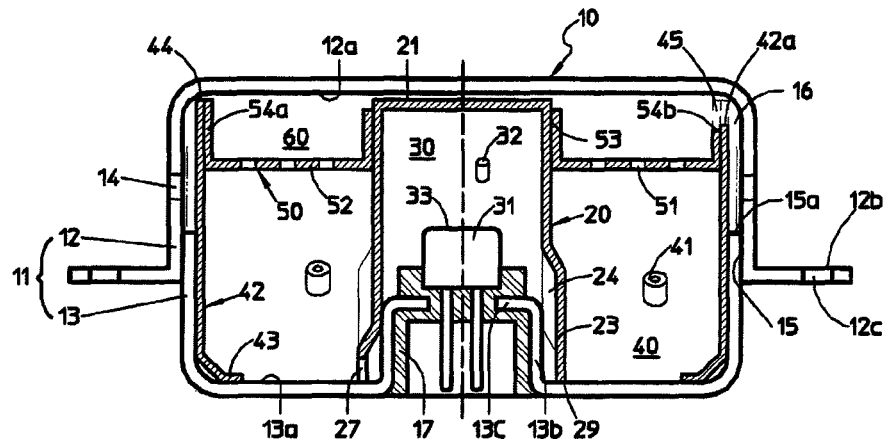
FIG. 1 shows an axial sectional view of a gas generator according to the present invention.

It is disclosed in JP-A No. 2005-53382 that a plurality of enhancer holes are formed in the inner cylindrical body 16, in the axial direction of the housing 3, but there is no enhancer hole on the igniter 18 side and a section lower than the igniter 18 (initiator shell 1 side). For this reason, the ignition property of the gas generating agent 4 existing in the initiator shell 1 side is not as good as that of the other gas generating agent 4, as described above.

As to showing of U.S. Pat. No. 5,458,371, it is difficult and troublesome to form the inclined hole on the circumferential wall surface of the curved cylindrical member 120. Furthermore, when the cylindrical member 120is thin, the hole 130 formed with inclination degrades an ejection-direction regulating function of the combustion product, whereby the ignition property remains problematic. However, a thicker cylindrical member 120 is not preferred in terms of weight reduction.

The present invention provides a gas generator for a restraining device for a vehicle, which is capable of improving the ignition property of the entire gas generating agent charged in a combustion chamber.

The housing that forms the outer shell container of the gas generator is not particularly limited. The housing may be the one in a short cylindrical shape (the diameter thereof is greater than the axial length) that is formed by a diffuser shell and a closure shell as shown in FIG. 1 of JP-A No. 10-95302, or the one in a long cylindrical shape (cylinder) in which both opened ends of a cylinder portion are closed by a closing member as shown in FIG. 1 of JP-A No. 2007-15573.

According to the gas generator of the present invention, the passage for the combustion product that reaches the ventilating portion is formed between the inner wall surface of the cup-shaped inner tube member and the outer circumferential surface of the igniter attaching portion, and, before activation, the inside of the inner tube member and the combustion chamber are communicated to each other.

At the time of the activation, the combustion product generated by the activation of the ignition device is released from the ventilating portion to the bottom surface (bottom plate) side of the second end of the housing in the combustion chamber, whereby combustion of the gas generating agent within the combustion chamber proceeds from the bottom side of the second end to the bottom side of the first end of the housing, that is, from the bottom to the top of the combustion chamber. As a result, the ignition property of the entire gas generating agent charged in the combustion chamber can be enhanced.

A path that allows the combustion product generated within the ignition chamber to pass through is formed from the ventilating portion toward the combustion chamber when the cup-shaped inner tube member is attached to the igniter attaching portion. Although it is preferred that the tube member be fixed to the igniter attaching portion by press-fitting, other known attaching method such as welding or crimping can be used instead of press-fitting.

The gas generator of the present invention may or may not use a conventional filter or coolant. The filter described here is the one that is disposed around a gas generating agent and cools combustion gas of the gas generating agent and filters the combustion residues of the combustion gas, example of which is disposed in the form of a cylinder around a gas generating agent (disclosed in JP-A No. 2005-53382), the one that is disposed on or above a gas generating agent (disclosed in U.S. Pat. No. 6,142,515), the one that is laid between gas generating agents in a combustion chamber, or the like.

According to the gas generator of the present invention, as long as the above discussed problem can be solved, a hole for releasing the combustion product to the combustion chamber can be formed on a circumferential wall surface of the inner tube member, separately from the ventilating portion described above.

The present application preferably provides the gas generator for a restraining device of a vehicle, wherein the cup-shaped inner tube member has the opening end portion and an enlarged diameter portion that is formed in the vicinity of the opening portion and has a diameter larger than that of other portion, and the passage for the combustion product that reaches the ventilating portion is formed between an inner wall surface of the enlarged diameter portion and the igniter attaching portion.

The thickness of the cup-shaped inner tube member is uniform, and the inner diameter of the enlarged diameter portion correspondingly increases.

The groove formed in the axial direction may be formed only in a circumferential wall surface of the inner tube member, or may be formed from the circumferential wall to the enlarged diameter portion.

Because the passage for the combustion product is formed by a combination of the grooves formed in the axial direction, the annular groove and the outer circumferential surface of the igniter attaching portion, the passage corresponding to the shape, depth and width of the grooves can be formed easily.

Although the number of grooves formed in the axial direction is one or two or more, it is preferred that two to eight of the grooves be formed with equal intervals.

The present invention preferably provides the gas generator for a restraining device of a vehicle, wherein the ventilating portion is a hole defined by a bottom plate of the second end of the housing and a cutout portion obtained by partially cutting a circumferential wall surface forming the opening end portion of the cup-shaped inner tube member.

By forming the ventilating portion as described above, combustion of the gas generating agent within the combustion chamber can proceed from a side of the bottom plate of the second end to a side of the bottom plate of the first end of the housing, whereby the ignition property of the entire gas generating agent charged in the combustion chamber can be enhanced.

The present invention preferably provides the gas generator for a restraining device of a vehicle, wherein the ventilating portion is a hole that is formed on a circumferential wall surface in the vicinity of the opening end portion of the cup-shaped inner tube member.

By forming the ventilating portion as described above, combustion of the gas generating agent within the combustion chamber can proceed from a side of the bottom plate of the second end to a side of the bottom plate of the first end of the housing, whereby the ignition property of the entire gas generating agent charged in the combustion chamber can be enhanced.

The present invention provides the gas generator for a restraining device of a vehicle, wherein the igniter attaching portion has a base circumferential surface, and a plurality of supporting portions that project from the base circumferential surface and are formed circumferentially with intervals to support the cup-shaped inner tube member, and the passage for the combustion product that reaches the ventilating portion is formed by the inner wall surface of the cup-shaped inner tube member and the base circumferential surface.

By the igniter attaching portion, the inner tube member is supported in the radial direction, and the passage reaching the ventilating portion can be formed easily. It is preferred that two to four supporting portions be provided. In this igniter attaching portion, the base circumferential surface and the supporting portions can be formed not only by cutting or forging a metallic igniter collar, but also by integrally injection-molding the base circumferential surface and the supporting portions to the metallic collar by using a known heat-resistant resin.

The present invention preferably provides the gas generator for a restraining device of a vehicle, wherein the plurality of supporting portions of the igniter attaching portion further have a second supporting portion for supporting the opening end portion of the cup-shaped inner tube member, the opening end portion of the cup-shaped inner tube member abuts against the second supporting portion, and the ventilating portion is formed by a gap between the opening end portion of the cup-shaped inner tube member and a bottom plate of the second end of the housing.

By the second supporting member, the inner tube member is supported in the axial direction, and at the same time the ventilating portion is formed. When the igniter attaching portion is formed by cutting or forging the metallic igniter collar, the second supporting member can be not only formed integrally with the supporting portion but also formed integrally by injection-molding a heat-resistant resin with respect to the supporting portion.

The present invention preferably provides the gas generator for a restraining device of vehicle, wherein the inner wall surface of the cup-shaped inner tube member has a protruding portion projecting inward, and the protruding portion abuts against an outer circumferential surface of the igniter attaching portion, and the passage for the combustion product that reaches the ventilating portion is formed by a section of the inner wall surface of the cup-shaped inner tube member, that is not in contact with the igniter attaching portion, and the outer circumferential surface of the igniter attaching portion.

Because the passage is formed with an interval corresponding to the height of the protruding portion, the passage can be formed easily. Although one or two or more protruding portions are formed, it is preferred that three to eight of the protruding portions be formed at equal intervals.

The protruding portion can be formed by deforming the outer wall surface of the inner tube member by pressing. Therefore, the formation of the protruding portion, fixation of the inner tube member to the igniter attaching portion, and formation of the passage for the combustion product can be carried out easily.

The present invention preferably further includes:

an outer circumference cylindrical member provided within the housing for defining an outer circumferential surface of the combustion chamber, such that one end opening thereof abuts against a bottom plate of the second end of the housing, and an annular porous member defining an upper surface of the combustion chamber and being provided between the outer circumference cylindrical member and the cup-shaped inner tube member such that a space is formed between the annular porous member and the bottom plate of the first end of the housing, the annular porous member including a plurality of holes, wherein gas discharge path is formed between the outer circumference cylindrical member and the circumferential wall portion of the housing, and the space and the gas discharge path are communicated with each other by a communication portion defined by the other end opening of the outer circumference cylindrical member and the bottom plate of the first end of the housing.

In the gas generator of the present invention, combustion of the gas generating agent within the combustion chamber proceeds from a side of the bottom plate of the second end to a side of the bottom plate of the first end of the housing, that is, from the bottom to the top of the combustion chamber. At this moment, due to the action of the outer circumference cylindrical member, the combustion gas also flows from the bottom to the top, passes through the porous member, further flows into the space, passes through the annular gas discharge path, and is thereafter discharged from the gas discharge port. Note that in addition to the communicating portion, an opening for communicating the combustion chamber and the gas discharge path with each other may be formed on a circumferential wall surface of the outer circumference cylindrical member, as long as the purpose of the present invention is achieved. Furthermore, when disposing a filter, the filter can be disposed in the space formed by the porous member and the bottom plate of the first end of the housing, or in the combustion chamber, or along the inner/outer circumferential wall surfaces of the outer circumference cylindrical member.

In this gas discharge process, the combustion gas collides with the porous member, then with the bottom plate of the first end of the housing, then with a side wall surface of the first end of the housing, and is then discharged from the gas discharge port while being in contact with a wall surface of the gas discharge path. Therefore, the residues contained in the combustion gas adhere to and are held by the collided surfaces each time the above-mentioned collision occurs, reducing its amount. Thus, a massive filter that occupies a significant mass or volume percentage in the gas generator can be simplified and reduced in size, thereby contributing largely to reduction in size and weight of the entire gas generator.

The present invention preferably provides the gas generator for a restraining device of a vehicle, which does not include a filter for cooling and filtering gas generated by combustion of the gas generating agent.

Because a filter that occupies a significant mass or volume percentage of the gas generator can be eliminated, the size and weight of the entire gas generator can be reduced significantly.

According to the gas generator of the present invention, the simple structure thereof can improve the ignition property of the gas generating agent.

The present invention can be used in a gas generator for a restraining device of a vehicle, such as an airbag apparatus mounted in various automobiles.

Figure 2:
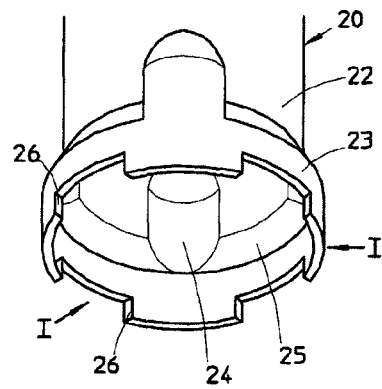
FIG. 2 shows a perspective view of an inner tube member used in FIG. 1.
Figure 3:
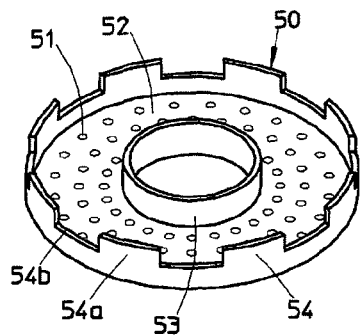
FIG. 3 shows a partial perspective view of a porous member used in FIG. 1.

EMBODIMENTS OF THE INVENTION (1) Gas Generator Shown in FIG. 1 to FIG. 3

FIG. 1 shows a sectional view of a gas generator 10 in the axial direction. FIG. 2 shows an enlarged perspective view of the axial direction of an inner tube member in part, used in the gas generator shown in FIG. 1, and the inner tube member in FIG. 1 is shown in a sectional view taken along the line I-I of FIG. 2 to make its shape clear. FIG. 3 shows a perspective view of a porous member used in FIG. 1.

A metallic housing 11 is obtained by welding and fixing a diffuser shell 12 and a closure shell 13 together at a contact portion. The diffuser shell 12 and the closure shell 13 are in the form of a cup, having one end open. A bottom plate 12a of the diffuser shell is a first end of the housing 11, and a bottom plate 13a of the closure shell is a second end of the housing 11. A flange 12b that has a hole 12c for fixing the housing to an airbag module (not shown) or the like is formed at an opening portion of the diffuser shell 12. As shown in FIG. 1, in the housing 11, the contact portion is welded and fixed (welded/fixed portion 15) such that the opening portion of the closure shell 13 is inserted into the opening portion of the diffuser shell 12, and a step 15a shown in FIG. 1 is provided in an inner circumferential surface of the welded/fixed portion 15.

The diffuser shell 12 has a plurality of gas discharge ports 14 in its side surface portion. The gas discharge ports 14 are sealed from the inside by an aluminum tape for prevention of moisture.

In a central portion of a bottom plate 13a of the closure shell 13, an igniter attaching portion is formed, which includes a cylindrical portion 13b projecting toward an ignition chamber 30 and an inward flange 13c facing inward from the cylindrical portion 13b. This attaching portion is formed integrally with the bottom plate 13a of the closure shell 13 by press-forming. Instead of integrally forming the igniter attaching portion with the closure shell as shown in FIG. 1, a conventional separate metallic igniter collar (with an igniter fixed thereto) may be used as the igniter attaching portion and then fixed to the closure shell by welding or crimping.

A cup-shaped inner tube member 20 is disposed in a central portion of the housing 11. The inner tube member 20 is press-fitted to the igniter attaching portion such that a bottom surface 21 of the inner tube member is separated from a bottom plate (a top panel in the state shown in FIG. 1) 12a of the diffuser shell 12 and an opening end portion 29 of the inner tube member abuts against the bottom plate 13a of the closure shell 13. Note that the bottom surface 21 may abut against the bottom plate (the top panel in the state shown in FIG. 1) 12a of the diffuser shell 12. Instead of press-fitting, the inner tube member 20 may be fixed to the igniter attaching portion by a well known method such as crimping or welding.

The inner tube member 20 has an enlarged diameter portion 23 that is formed in the opening end portion 29 and a circumferential wall surface 22 in the vicinity thereof and has outer and inner diameters larger than other sections.

The inner wall surface extending from the circumferential wall surface 22 to the enlarged diameter portion 23 has a plurality of grooves (two grooves in FIG. 2) 24 formed in the axial direction, and an annular groove (annular curved surface) 25 is formed in an inner wall surface of the enlarged diameter portion 23 so as to communicate with end portions of the grooves 24, located in the opening end portion 29 side.

As shown in FIG. 2, an opening portion of the enlarged diameter portion 23 (the opening end portion of the inner tube member 20) has a plurality of cutout portions 26, and four ventilating portions 27 for allowing the combustion product to pass therethrough are formed by the cutout portions 26 and the bottom plate 13a of the closure shell.

The inside of the inner tube member 20 is the ignition chamber 30 for accommodating an igniter 31 and a transfer charge (or a gas generating agent) 32. The gas generating agent can be used as the transfer charge.

The igniter 31 has an igniting portion 33 accommodating the ignition charge therein, and is integrally attached to the igniter attaching portion projecting into the ignition chamber 30, by a resin 17.

A cylindrical space on the outside of the inner tube member 20 defines a combustion chamber 40 charged with a gas generating agent 41. In FIG. 1, the igniter 31 is disposed coaxially with the central axis of the housing 11. However, when, for example, the igniter 31 is provided eccentrically with respect to the central axis of the housing 11, a larger number of cutout portions 26 or grooves 24 can be formed in a portion of the opening end portion, where there is more of the gas generating agent (for example, the inner tube member and the igniter attaching portion of the present invention may be applied to the flame-transferring tube 18 and igniter collar 32 of the gas generator shown in FIG. 1 of JP-A No. 2008-114718, to form a communicating structure between the ignition chamber and the combustion chamber).

An outer circumferential surface of the combustion chamber 40 is formed by an outer circumference cylindrical member 42 disposed within the cylindrical space, an inner circumferential surface by the inner tube member 20, and a bottom surface by the bottom plate 13a of the closure shell. An upper surface of the combustion chamber 40 is formed by providing an annular porous member 50, which has a plurality of holes 51, to an annular opening portion in the bottom plate 12a side of the diffuser shell between the outer circumferential surface and the inner circumferential surface of the combustion chamber.

In the outer circumference cylindrical member 42, an opening end 43 on one end side is in the form of an inward flange, which abuts against the bottom plate 13a of the closure shell, and an opening end 44 on the other end side is disposed with distance from the bottom plate 12a of the diffuser shell. The substantially lower half of a circumferential wall abuts against an inner circumferential wall surface of the closure shell 13. Here, a cylindrical gas discharge path 16 is formed between the substantially upper half of a circumferential wall of the outer circumference cylindrical member 42 and an inner circumferential wall surface of the diffuser shell 12 by the step 15a formed in the vicinity of the welded/fixed portion 15. A rim of the opening end 44 of the outer circumference cylindrical member 42 forms a partially cutout portion 42a (similar to the cutout portion 26 shown in FIG. 2).

The annular porous member 50 has an annular bottom plate 52 having a large number of holes 51, an inside annular wall 53 formed at an inner circumferential rim of the annular bottom plate 52, and an outside annular wall 54 formed at an outer circumferential rim of the annular bottom plate 52.

Moreover, as shown in FIG. 1, the annular porous member 50 is fitted between the outer circumference cylindrical member 42 and the inner tube member 20, and an annular space 60 is defined by the annular porous member 50, the outer circumference cylindrical member 42, the inner tube member 20, and the bottom plate 12a of the diffuser shell.

The outside annular wall 54 is created by forming eight convex portions 54a and eight concave portions 54b alternately in the circumferential direction, and forms, together with the cutout portion 42a of the outer circumference cylindrical member 42, a communicating portion 45 communicating the annular space 60 and the gas discharge path 16 with each other. As shown in FIG. 1, when the annular porous member 50 is fitted between the outer circumference cylindrical member 42 and the inner tube member 20, the communicating portion 45 is formed by aligning the positions of the cutout portions 42a of the outer circumference cylindrical member 42 and the eight concave portions 54b.

An operation of the gas generator 10 shown in FIG. 1 to FIG. 3, when incorporated in a known airbag apparatus of a vehicle, is described next.

When the igniter 31 is activated, the transfer charge (or gas generating agent) 32 is ignited and burnt by a flame generated from the ignition portion 33, whereby the combustion product (flame, combustion gas, and the like) is generated.

The combustion products is released from the ventilating portion 27 to the vicinity of the bottom plate 13a of the closure shell within the combustion chamber 40, after passing through a groove 24 and an annular groove 25 of the inner tube member 20 and the passage (the passage formed by the groove 24 and the annular groove 25) formed on an outer circumferential surface of the igniter attaching portion (cylindrical portion 13b). At the time of the activation of the gas generator, even when the inner tube member 20 moves upward (to the bottom plate 12a side of the diffuser shell 12), the cross-sectional area of the passage formed between the igniter attaching portion (cylindrical portion 13b) and the inner tube member 20 is substantially constant, thus the activation performance of the gas generator is stable.

Because the combustion product is released to the vicinity of the bottom plate 13a of the closure shell in the manner described above, the ignition and combustion of the gas generating agent 41 charged inside the combustion chamber 40 proceeds from the bottom of FIG. 1 upward successively, whereby the ignition property of the entire gas generating agent 41 is improved.

Some of the combustion residues generated along with the gas generated from the gas generating agent 41 collide with, adhere to and are held by the annular bottom plate 52 while passing through the holes 51 of the porous member 50. The size (diameter) of each hole 51 of the porous member 50 is smaller than the size of the gas generating agent 41 (size of each gas generating agent 41). It is preferred that each hole 51 have the size that allows the gas generating agent to remain inside the combustion chamber 40 and burn completely without passing through the hole 51 during the combustion of the gas generating agent. Alternatively, the size of each hole 51 may be set to be larger than the size of the gas generating agent 41 (size of each gas generating agent 41), and a known filter or coolant such as a coarse wire mesh or screen may be disposed between the gas generating agent 41 and the annular bottom plate 52.

The combustion residues, that have passed through the holes 51, then collide with the bottom plate 12a of the diffuser shell when flowing into the annular space 60, and adhere to and are held by the bottom plate 12a.

The combustion gas, that flows into the annular space 60, then collides with the outside annular wall 54 (the convex portions 54a and the concave portions 54b) of the porous member 50 while flowing out of the communicating portion 45, and the combustion residues adhere to and are held by the outside annular wall 54.

Thereafter, the combustion gas that has passed through the communicating portion 45 collide with the inner circumferential wall surface of the diffuser shell 12 opposing the communicating portion 45, whereby the combustion residues adhered to and are held by the inner circumferential wall surface.

Thereafter, the combustion gas passes through the gas discharge path 16, breaks the aluminum tape sealing the gas discharge ports 14, and is released from the gas discharge ports 14 to the inside of the airbag.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas can be simplified or eliminated. Although a known filter is not used in FIG. 1, when using the filter, the filter can be disposed in the above-mentioned porous member 50 (the upper portion of the combustion chamber 40), the space 60, or the gas discharge path 16. In addition, a communicating hole can be formed on a circumferential wall surface of the outer circumference cylindrical member 42, and the filter can be disposed along inner/outer circumferential wall surfaces of the outer circumference cylindrical member 42.

Figure 4:
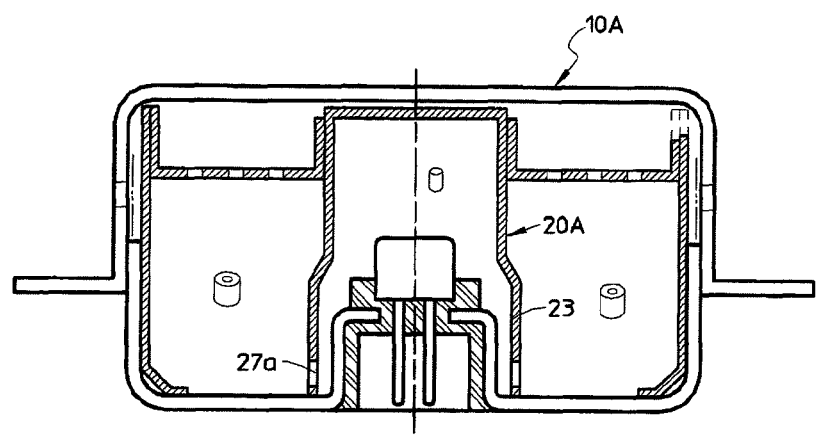
FIG. 4 shows an axial sectional view of a gas generator according to another embodiment.
Figure 5:
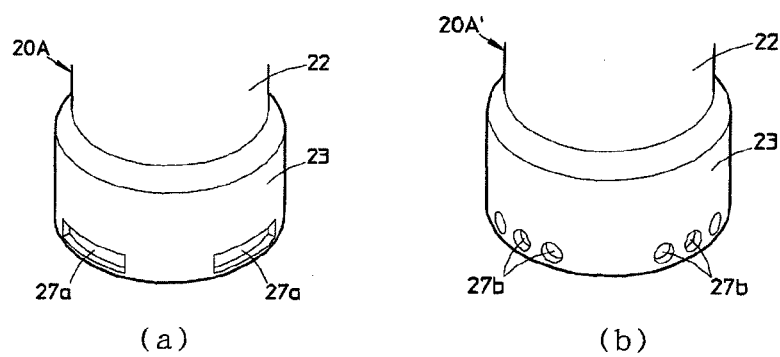
FIG. 5(*a*) shows a partial perspective view of an inner tube member used in FIG. 4, FIG. 5(*b*) shows a partial perspective view of an inner tube member according to another embodiment.

(2) Gas Generator Shown in FIG. 4 and FIG. 5

FIG. 4 shows sectional view of a gas generator 10A in the axial direction and the gas generator 10A is the same as the gas generator of FIG. 1, except that a cup-shaped inner tube member 20A is used. FIG. 5(a) is a partial perspective view of the inner tube member 20A used in the gas generator shown in FIG. 4, and FIG. 5(b) is a partial perspective view of an inner tube member 20A' of another embodiment.

The inner tube member 20A shown in FIG. 5(a) has an enlarged diameter portion 23 on a circumferential wall portion 22 at an opening end portion. A total of four rectangular holes (ventilating portions) 27a are formed at equal intervals in the vicinity of an opening portion of the enlarged diameter portion 23.

The inner tube member 20A' shown in FIG. 5(b) has the enlarged diameter portion 23 on the circumferential wall portion 22 at the opening end portion. A total of four groups (twelve holes in total) of circular holes (ventilating portions) 27b, where each group has three circular holes, are formed at equal intervals in the vicinity of the opening portion of the enlarged diameter portion 23.

The passage for the combustion product is formed between the enlarged diameter portion 23 of the inner tube members 20A and 20A', and the igniter attaching portion (cylindrical portion 13b).

Figure 6:
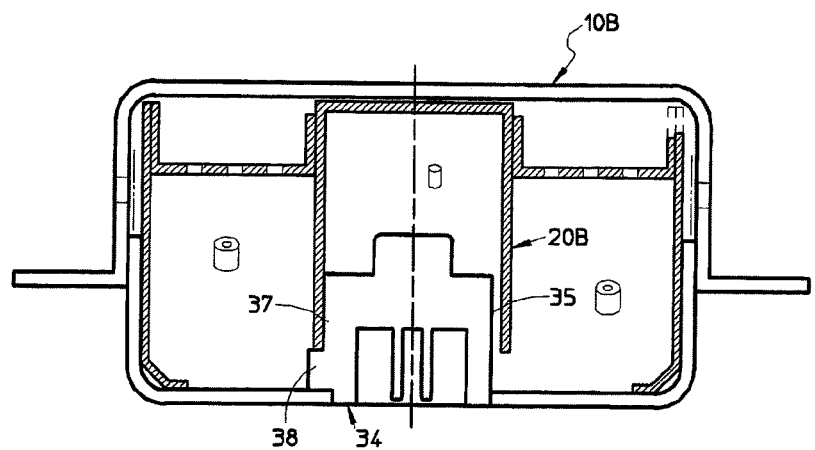
FIG. 6 shows an axial sectional view of a gas generator according to yet another embodiment.
Figure 7:
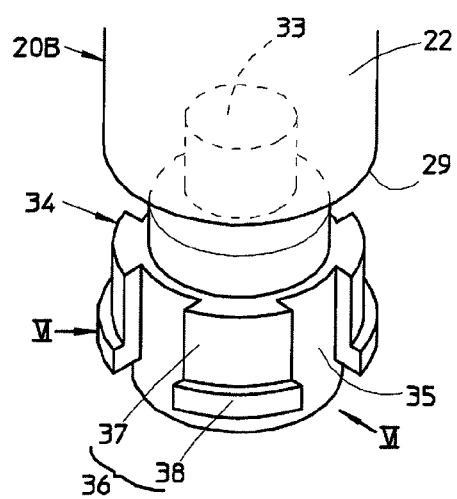
FIG. 7 shows a partially enlarged perspective view of an igniter and inner tube member used in FIG. 6.

(3) Gas Generator Shown in FIG. 6 and FIG. 7

FIG. 6 shows sectional view of a gas generator 10B in the axial direction. The gas generator 10B is the same as the gas generator in FIG. 1, except that a cup-shaped inner tube member 20B is used and that a structure for fixing the igniter is different. FIG. 7 shows a partial perspective view of the igniter and the inner tube member 20B. However, FIG. 6 shows a cross-sectional view taken along the line VI-VI of FIG. 7 in order to illustrate the shape of the inner tube member 20B clearly.

The inner tube member 20B includes only a bottom surface and the circumferential wall surface 22. The inner tube member 20B has no enlarged diameter portion shown in FIG. 2 and FIG. 5.

The igniter attaching portion uses a metallic collar 34 that is a separate member from the closure shell 13. The collar 34 has a base circumferential surface 35 and four supporting portions 36 for the inner tube member that are formed at equal intervals in the circumferential direction. The supporting portions 36 include a radial-direction supporting portion 37 and an axial-direction supporting portion 38. The collar 34 is fixed to the closure shell 13 by a welding or the like.

As shown in FIG. 6, the inner tube member 20B is supported by the abutment between an inside surface of the circumferential wall surface 22 and the radial-direction supporting portion 37, and the abutment between the opening end portion 29 and the axial-direction supporting portion 38.

Four passages are formed at equal spaces between the inner tube member 20B and the base circumferential surface 35 of the collar 34.

In FIG. 7, the igniter attaching portion is a metallic collar and all of the base circumferential surface 35, the radial-direction supporting portion 37 and the axial-direction supporting portion 38 are metals. However, for example, the radial-direction supporting portion 37 or the axial-direction supporting portion 38 may be integrally molded to the metallic base circumferential surface 35 by using a known heat-resistant resin, or the base circumferential surface 35, the radial-direction supporting portion 37 and the axial-direction supporting portion 38 all may be integrally molded to the metallic collar by using the resin. However, when welding and fixing the igniter attaching portion to the bottom plate 13a of the closure shell 13, the metallic portion of the welding section of the attaching portion is exposed.

Figure 8:
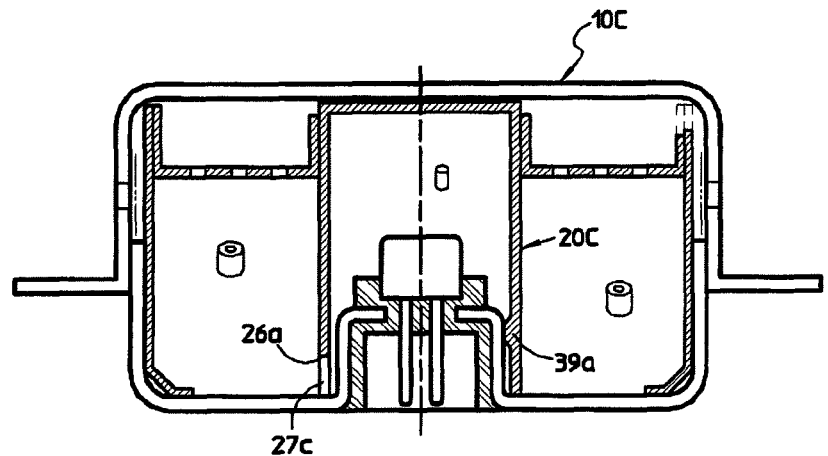
FIG. 8 shows an axial sectional view of a gas generator according to yet another embodiment.
Figure 9:
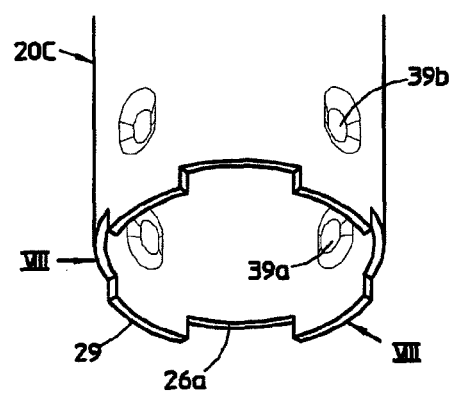
FIG. 9 shows a partially enlarged perspective view of an inner tube member used in FIG. 8.

(4) Gas Generator Shown in FIG. 8 and FIG. 9

FIG. 8 shows sectional view of a gas generator 10C in the axial direction and the gas generator 10C is the same as the gas generator in FIG. 1, except that a cup-shaped inner tube member 20C is used. FIG. 9 shows a partially enlarged perspective view of the inner tube member 20C used in the gas generator shown in FIG. 8. However, FIG. 8 shows a cross-sectional view taken along the line VIII-VIII of FIG. 9 in order to illustrate the shape of the inner tube member 20C clearly.

The inner tube member 20C has four concave portions 39b that are formed, on the outer circumferential wall surface 22, at equal intervals in the circumferential direction at the opening end portion 29. The four concave portions 39b are four convex portions 39a projected in the inner circumferential wall surface side.

The opening end portion 29 of the inner tube member 20C has four cutout portions 26a, and four ventilating portions 27c for allowing the combustion product to pass therethrough are formed by the cutout portions 26a and the bottom plate 13a of the closure shell.

The passage is formed between the inner tube member 20C and the igniter attaching portion (cylindrical portion) 13b by the presence of the four convex portions 39a.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device of a vehicle comprising:
    a housing forming an outer shell container of the gas generator, having a circumferential wall portion which is provided with a gas discharge port, a first end, and a second end opposite to the first end, the first end and the second end being both closed;
    a cup-shaped inner tube member disposed in the housing, an inside thereof being an ignition chamber accommodating an ignition device, an outside thereof being a combustion chamber charged with a gas generating agent, the cup-shaped inner tube member including,
        a bottom surface located in a bottom plate of the first end of the housing, and
        an opening end portion provided with a ventilating portion for allowing a combustion product of the ignition device to pass therethrough; and
    an igniter of the ignition device attached to an igniter attaching portion formed at the second end of the housing,
    a passage for the combustion product defined between an inner wall surface of the cup-shaped inner tube member and the igniter attaching portion, and reaching the ventilating portion, such that the combustion product is released to a side of the second end in the combustion chamber thereby combustion of the gas generating agent proceeds from the second end to the first end.

2. The gas generator for a restraining device of a vehicle according to claim 1, wherein the cup-shaped inner tube member has the opening end portion and an enlarged diameter portion formed in a vicinity of the opening end portion and has a diameter larger than that of other portion, and
    the passage for the combustion product that reaches the ventilating portion is defined between an inner wall surface of the enlarged diameter portion and the igniter attaching portion.

3. The gas generator for a restraining device of a vehicle according to claim 1, wherein the ventilating portion is defined by a bottom plate of the second end of the housing and a circumferential wall surface forming the opening end portion of the cup-shaped inner tube member.

4. The gas generator for a restraining device of a vehicle according to claim 1, wherein the ventilating portion is a hole that is in on a circumferential wall surface in the vicinity of the opening end portion of the cup-shaped inner tube member.

5. The gas generator for a restraining device of a vehicle according to claim 1, wherein the igniter attaching portion has a base circumferential surface, and a plurality of supporting portions that project from the base circumferential surface and are formed circumferentially with intervals to support the cup-shaped inner tube member, and
    the passage for the combustion product that reaches the ventilating portion is defined by the inner wall surface of the cup-shaped inner tube member and the base circumferential surface.

6. The gas generator for a restraining device of a vehicle according to claim 5, wherein the plurality of supporting portions of the igniter attaching portion further have a second supporting portion for supporting the opening end portion of the cup-shaped inner tube member,
    the opening end portion of the cup-shaped inner tube member abuts against the second supporting portion, and
    the ventilating portion is defined by a gap between the opening end portion of the cup-shaped inner tube member and a bottom plate of the second end of the housing.

7. The gas generator for a restraining device of vehicle according to claim 1, wherein the inner wall surface of the cup-shaped inner tube member has a protruding portion projecting inward, and the protruding portion abuts against an outer circumferential surface of the igniter attaching portion, and
    the passage for the combustion product that reaches the ventilating portion is defined by a section of the inner wall surface of the cup-shaped inner tube member, that is not in contact with the igniter attaching portion, and the outer circumferential surface of the igniter attaching portion.

8. The gas generator for a restraining device of a vehicle according to claim 1, further comprising:
    an outer circumference cylindrical member provided within the housing for defining an outer circumferential surface of the combustion chamber, such that one end opening thereof abuts against a bottom plate of the second end of the housing; and
    an annular porous member defining an upper surface of the combustion chamber and being provided between the outer circumference cylindrical member and the cup-shaped inner tube member such that a space is formed between the annular porous member and the bottom plate of the first end of the housing, the annular porous member including a plurality of holes,
    wherein gas discharge path is formed between the outer circumference cylindrical member and the circumferential wall portion of the housing, and
    the space and the gas discharge path are communicated with each other by a communication portion defined by the other end opening of the outer circumference cylindrical member and the bottom plate of the first end of the housing.

9. The gas generator for a restraining device of a vehicle according to claim 1, wherein the gas generator has no filter for cooling and filtering gas generated by combustion of the gas generating agent.

* * * * *